United States Patent [19]

Popow

[11] Patent Number: 4,631,161

[45] Date of Patent: Dec. 23, 1986

[54] CONTINUOUS MOLDING METHOD

[76] Inventor: Anatoliy Popow, 6009 S. Rte 31, Crystal Lake, Ill. 60014

[21] Appl. No.: 697,203

[22] Filed: Feb. 1, 1985

Related U.S. Application Data

[62] Division of Ser. No. 458,787, Jan. 18, 1983, Pat. No. 4,497,619.

[51] Int. Cl.$^4$ ............................................. B29C 47/32
[52] U.S. Cl. ..................... 264/167; 264/236; 264/237; 264/297.8; 264/310; 264/DIG. 59; 425/374; 425/DIG. 109
[58] Field of Search ............... 264/167, 165, 166, 175, 264/236, 310, 297.8, 237, DIG. 59; 425/363, 367, 75, 115, 465, 471, 466, 374, DIG. 109

[56] References Cited

U.S. PATENT DOCUMENTS

| | | | |
|---|---|---|---|
| 1,844,972 | 2/1932 | Parkhurst | 425/466 |
| 2,224,430 | 12/1940 | Garbutt | 425/75 |
| 3,142,091 | 7/1964 | Curtiss | 425/374 |
| 3,196,196 | 7/1965 | Burbank | 264/167 |
| 3,394,431 | 7/1968 | Nalle, Jr. | 264/167 |
| 4,133,861 | 1/1979 | Kato | 425/224 |
| 4,165,960 | 8/1979 | Lemelson | 425/145 |
| 4,174,200 | 11/1979 | Hoj | 425/465 |
| 4,191,723 | 3/1980 | Vargiu et al. | 264/175 |
| 4,193,959 | 3/1980 | Lemelson | 264/166 |
| 4,204,822 | 5/1980 | Hewitt | 425/210 |
| 4,316,708 | 2/1982 | Skach et al. | 425/73 |

FOREIGN PATENT DOCUMENTS

| | | | |
|---|---|---|---|
| 1229279 | 12/1962 | Fed. Rep. of Germany | 425/374 |
| 2005242 | 12/1969 | France | 264/167 |

Primary Examiner—Jeffery Thurlow
Attorney, Agent, or Firm—Michael Kovac

[57] ABSTRACT

A continuous molding method is disclosed as providing a sliding seal chamber in which moving molding surfaces form and can provide means for the induction of such temperature changes required to produce finished products from the chosen raw material.

10 Claims, 5 Drawing Figures

CONTINUOUS MOLDING METHOD

This is a divisional of copending U.S. patent application Ser. No. 458,787 filed Jan. 18, 1983, now U.S. Pat. No. 4,497,619, issued on Feb. 5, 1985.

BACKGROUND OF THE INVENTION

There are numerous well known techniques for the manufacture of molded products; however, where it may be desired for such products to be joined to one another such as an interconnected strip of plastic sealing gaskets which are joined such that they may be installed using continuous operational means, a two step process is required. First, an extruded sheet of material is produced, and then a secondary die cutting operation is performed to stamp out the selected gasket design. While the scrap from the secondary die cutting operation can be recovered and re-used in subsequent extrusion operations, this is very costly, time consuming and inefficient. Continuous molding profile techniques cannot be used alone for such a product since the processing techniques deal only with the cross-sectional shape or profile of the product to be produced. Injection molding is not possible since the molds must be opened and the product removed after each molding operation, thus making it impossible to produce an interconnected strip of molded products. Certain endless and rotary extrusion techniques have been employed for the manufacture of molded parts; however, such processes are limited in speed, product application, the variety of the product design that may be desired, and the capability to rapidly change product design configurations produced by the same general apparatus. Examples of such prior art endless and rotary extrusion processes and techniques are shown in U.S. Pat. Nos. 2,964,789; 3,121,913; and 4,165,960.

There has been a long felt need in the continuous molding art for a high sped continuous scrapless molding technique that permits production of a wide range of products without sacrificing design considerations for the product to be produced. Such products may include an interconnected strip of gaskets, industrial seals, o-rings, filter materials and various other elongated structural and sheet-like molded products which can be continously produced either connected to or separate from one another during the molding operation, as may be desired.

SUMMARY OF THE INVENTION

Accordingly, it is the primary object of the present invention to provide a continuous high speed scrapless molding process and method which permits a wide range of products to be produced.

Another object of the present invention is to provide a low cost economical apparatus and method for the continuous high speed scrapless manufacture of molded products.

Still another object of the present invention is to provide a continuous high speed scrapless technique that is simple, efficient, does not sacrifice design considerations for the products to be produced, and permits rapid change of design for molded parts to be produced from the same general apparatus.

These and other objects, advantages and potential product applications of the herein disclosed continuous molding apparatus and method will become apparent from the ensuing description.

DESCRIPTION OF THE PREFERRED EMBODIMENTS

In the description that is to follow, the continuous molding apparatus and method is described in conjunction with the production of an interconnected strip of gaskets; however it is to be understood that many different types of molded products made from many different types of materials can be produced by the herein disclosed continuous molding apparatus and method. The apparatus and method may also be applied to such product designs where a single-finished (not interconnected) product is desired.

Figure 1:
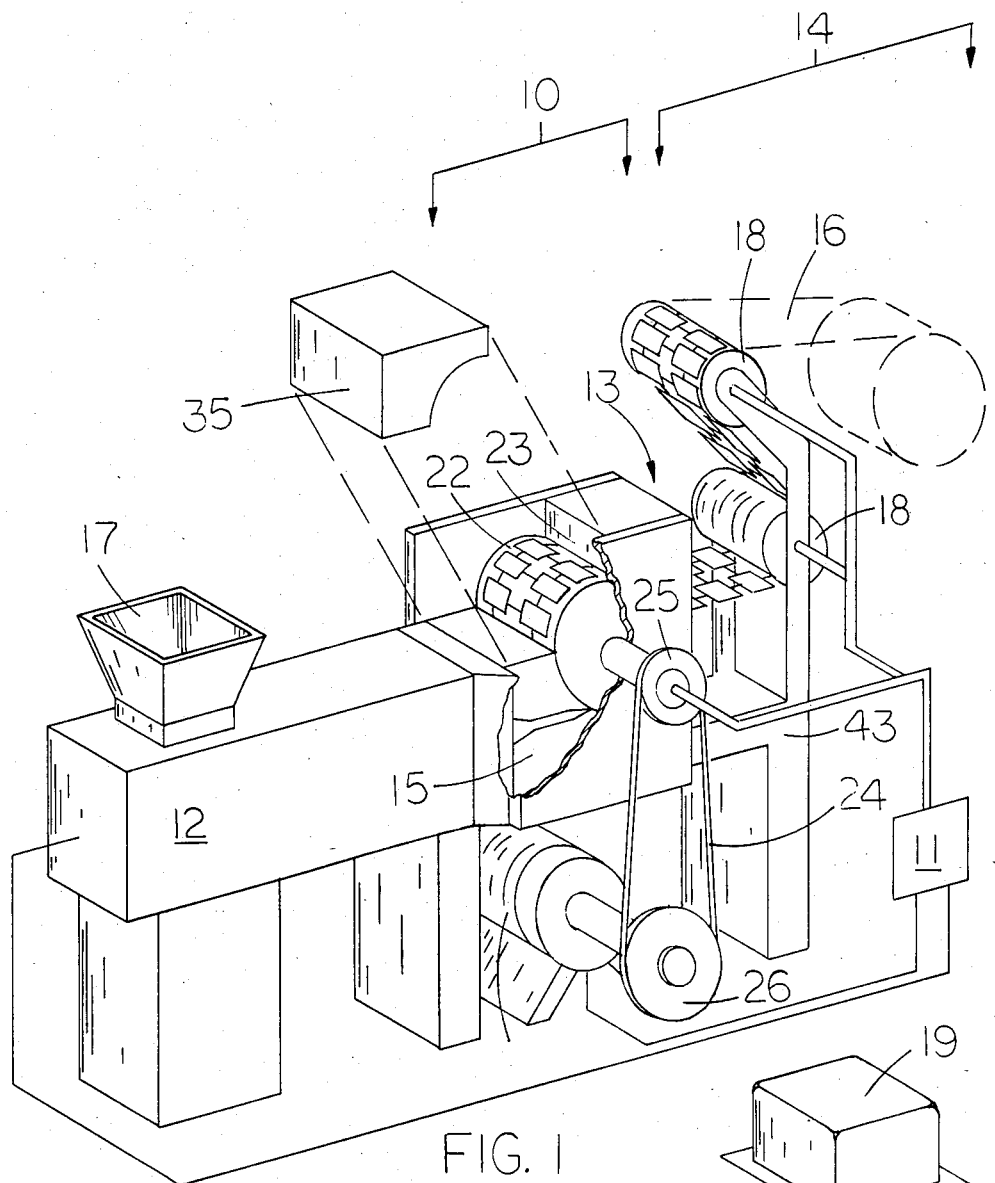
FIG. 1 is an isometric side view of the continuous molding apparatus which is constructed in accordance with the teachings of the present invention.

In FIG. 1 of the drawings there is shown a continuous molding machine 10 including extruder 12, molding head 13 and a possible finished product handling system 14. The extruder component 12 may operate by any means or combination of devices for continuously feeding predetermined quantities material at any desired temperature or pressure that may be required by product design. The finished product handling system 14, if applicable, may operate by any means or combination of devices to continuously aid in handling and even assist in temperature control to provide subsequent curing of the finished product. Such temperature control and synchronized operation (with respect to the molding apparatus) of the finished product handling system 14 can be achieved by the systems control center 11 and means for a continuous flow of temperature changing medium through the finished product handling system 14. Temperature control of the raw material can be achieved by the combined operations of the systems control center 11 and temperature controlling elements contained in the nozzle 15 that connects the extruder component 12 to the molding head 13.

Figure 2:
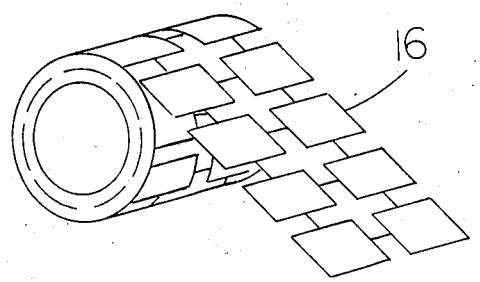
FIG. 2 is a perspective view of a roll of interconnected gaskets representative of one type of product that can be formed by the apparatus and method of the present invention.

With the interconnected strip of gaskets 16 shown in FIGS. 1 and 2 of the drawings, the preferred molding material is polymeric and such material would be deposited in the hopper 17, and fed in a molten or liquid condition through the nozzle 15 to the molding head 13. The selection of the particular type and general compound of molding material will, of course, vary to meet the demands of the product being molded. It is believed that thermoplastic and thermosetting resins may be used, dependent upon the particular application; however, for thermosetting resins, subsequent curing may also be required. Post-molding curing may, if desired, be applied to any finished product by means of a system of one or more temperature controlled rollers 18, or devices, used in conjunction with the finished product handling system 14.

Figure 3:
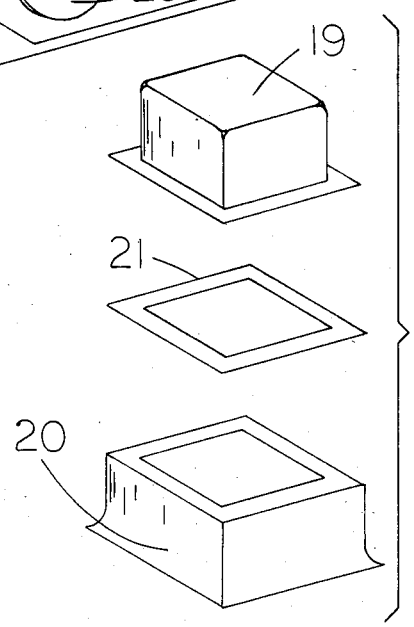
FIG. 3 is a perspective view of a mechanical case and cover assembly showing one of the possible applications for products produced.

In FIG. 3, the elongated gasket product 21 is shown being applied to form a seal between a cover 19 and a case 20, as is well known.

Figure 4:
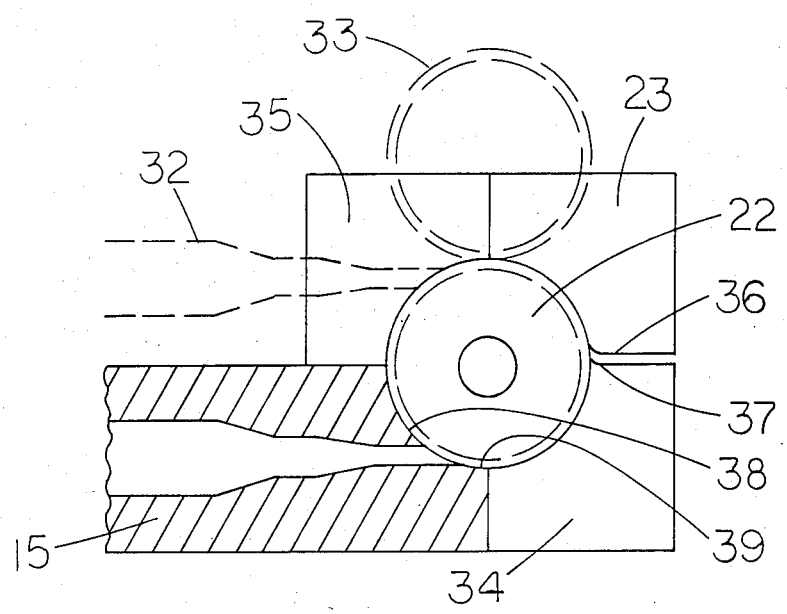
FIG. 4 is a side elevational section view of the molding head of the continuous molding apparatus.
Figure 5:
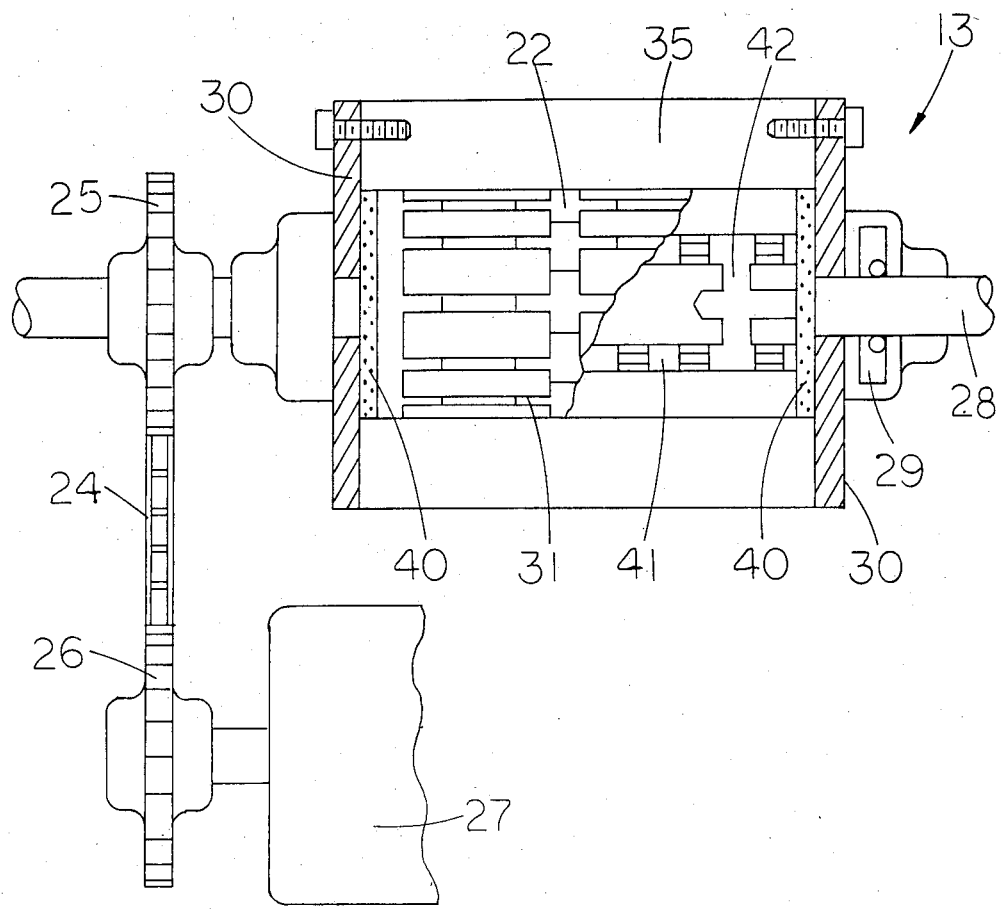
FIG. 5 is a side elevational view, partially in section, of the components and elements of the continuous molding apparatus shown in FIG. 1.

As shown in FIGS. 1, 4 and 5, the molding head 13 includes a rotary or endless molding element 22 mounted in kissing contact with the molding case. The case is comprised of three sealing chamber elements 23, 34, 35 and the material feeding nozzle 15. The shaft of the rotary molding element 22 is extended to receive a chain sprocket 25 which is connected to the corresponding chain sprocket 26 of the motor 27 by a chain 24, as shown in FIG. 5. The rotational speed of the molding element 22 may be controlled by the systems control 11 to suit the requirements of the finished product.

In order to understand the structural interrelationship and operation of the molding head 13, reference is made to FIGS. 4 and 5 of the drawings. In FIG. 5 it is seen that the shaft 28 of the molding element 22 is journaled on each end by the bearings 29. The bearings themselves are mounted on side frame members 30 which are supported by base frame members 43 as shown in FIG. 1.

The arrangement and mounting of the ends of the rotary molding element 22 relative to the side frame members 30 is such that they are each in kissing contact with sealing elements 40, 40 as shown in FIG. 5. This is important since the rotary molding element 22 is provided with the mold configuration 31 formed therein which corresponds in shape to the molded part desired. Another important reason for the kissing contact is that the raw material will be forced under pressure and confined within the mold or form configurations 31 during the rotary molding operation.

A very important feature of the present invention is that the rotary molding element 22 is surrounded by a sealed chamber means for maintaining a predetermined pressure and temperature during the molding process. More specifically, the sealed chamber means provide a sliding seal through the kissing contact between it and the rotary molding element 22 as seen in FIGS. 4 and 5. This is important so that predetermined quantities of raw material fed by the nozzle 15 into the rotary molding element 22 will be confined mechanically, atmospherically and thermally for accurate, efficient and high speed molding or forming operations.

The sealed chamber providing the sliding seal contact is shown in FIGS. 1, 4 and 5 as being represented by the semicircular sealing elements 23, 34, 35 which are mounted to the side frame members 30, 30 by screws, as shown in FIG. 5. These sealing elements 23, 34, 35 also double as the outer frame members of the molding head 13. As best seen in FIG. 4, the sealing elements 23, 34, 35 sealingly contact the rotary molding element 22 for an arc of approximately 90 degrees in each of their respective locations. The remaining arc of the molding element 22 is sealed by the semi-circular surface of the nozzle 15. It is to be noted here that the three sealing elements 23, 34, 35 are removeable for fast easy cleaning and set-up as shown in FIG. 1. It should also be understood that arrangement of the nozzle 15 and sealing elements 23, 34, 35 in relationship to the rotary molding element 22 can be designed to present the forced raw material at any desired cross sectional point along the surface of the rotary molding element 22 as represented in FIG. 4 by the dotted line sample alternate position 32 of the nozzle 15. One may also find it necessary to add one or more additional rotary elements 33 if the product design requires more of a temperature change or possibly a second rotary element that also includes the mold configuration 31. These possiblities are best seen in FIG. 4.

In further description of the arrangement of the sealing elements 23, 34, 35 and the nozzle 15, it will be seen that the lower sealing element 34 butts up against the nozzle 15 and extends the curvilinear surface of the nozzle 15 counterclockwise approximately 90 degrees. The upper front sealing element 35 butts up against the nozzle 15 and the upper rear sealing element 23 extending the curvilinear surface of the nozzle approximately 180 degrees in a clockwise direction as shown in FIG. 4. This and any other structural arrangements may provide a molded part discharge port 36 which is laterally and circumferentially offset from the "kissing contact" areas between the sealing elements 23, 34, 35 and the rotary molding element 22. Thus, after the raw material is pressed and confined within the mold configurations 31 during the sealed and sliding molding operation, the products are ejected through the offset discharge port 36 with the marginal end surface 37 of the lower sealing element 34 possibly serving as a stripper for separating the molded product from the mold configurations 31 of the molding element 22.

In order to insure complete circumferential sliding seal contact, except at the discharge port 36, the nozzle 15 is provided with upper and lower curvilinear surfaces 38 and 39 respectively which have a complementary configuration to the upper front sealing element 35 and the lower sealing element 34, as seen in FIG. 4. The upper and lower curvilinear surfaces 38, 39 structurally cooperate with sealing elements 23, 34, 35 to provide a circumferential seal around the molding element 22 except at the molded part discharge port 36.

For a sliding sealing engagement along the end surfaces of the rotary molding element 22 there is provided end sealing elements 40, 40 at opposite ends of the rotary molding element 22. The end sealing elements 40, 40 are mounted by suitable means to the side frame members 30, 30 and have openings therein for receipt of the shaft 28 of the rotary molding element 22. It is to be noted that the one-piece end sealing elements 40, 40 sealingly contact the end surfaces of the rotary molding element 22 including the area of "kissing contact" thereof. The outer edges of the end sealing elements 40, 40 sealingly contact the curvilinear surfaces of the sealed chamber elements 23, 34, 35 and the upper and lower curvilinear surfaces 38, 39 of the nozzle 15 as is best seen in FIG. 5.

As a result of the aforementioned sliding sealing contact of the sealing chamber elements 23, 34, 35, the nozzle 15 and the end sealing elements 40, 40 with the rotary molding element 22, it is possible to force raw material from the nozzle 15 into the mold configurations 31, and accurately confine and press the molding material therewithin in the "kissing contact" area of the rotary molding element 22, while the rotary molding element 22 is maintained in a sliding contact sealed chamber to provide a controlled mechanical, atmospheric and thermal environment during the molding operation.

To assist in maintaining the desired thermal environment required for the finishing of the molded product, one (or more, if applicable) rotary molding element 22 is provided with temperature control means to facilitate curing and stripping from the mold configuration 31, thereby to enhance the speed of production. This may be provided, for example, by the axially offset and circumferentially spaced flow channels 41 which are shown as being fabricated inside the rotary molding element 22 of FIG. 5. Note further that the flow channels 41 are interconnected to each other by a common linking channel area 42 which, in turn is linked to the shaft 28 of the rotary molding element 22. The shaft 28, at each end thereof, is also axially bored for connection at each end to a continuous source of such substances that will provide the desired thermal control. The appropriate rotary seals, valves, pumps and controlling devices, not shown, facilitate the operation of the thermal control means.

Various types of materials can be used for the various components of the molding apparatus to achieve the desired life, while minimizing cost and downtime. The invention is not to be limited to the types of material used, except insofar as their structural and functional design indicates.

With the aforementioned constructions and configurations, the continuous molding apparatus and method of the present invention produces accurately and efficiently molded parts without scrap at a high speed of production. A broad range of products can be produced without sacrificing design considerations. Rapid design changes to meet industry demands can be made by producing a number of rotary molding elements with different mold configurations which can be interchanged in the apparatus. The simplicity, low cost and efficient operation of the herein disclosed method and apparatus can now be fully understood and appreciated.

I claim:

1. A continuous molding method comprising the steps of molding products between complementary molding surfaces at least one of which is continuously moving relative to the other, at least one of said complementary molding surfaces also being configured to form a series of discrete molded products, forcing molding material in a moldable condition between the complementary molding surfaces, and continuous sliding sealing of the molding material in a molding material chamber around each of the discrete products to be molded by the complementary molding surfaces while forming continuous predetermined molding material pressure, temperature and confinement in the molding material chamber around each of the discrete products to be molded during the molding operation.

2. The method as defined in claim 1 including at least partially curing the discrete molded products in the molding material chamber prior to removal from the complementary molding surfaces.

3. The method as defined in claim 1 including forming a connected series of discrete molded products in a plurality of adjacent rows by the complementary molding surfaces.

4. A continuous molding method comprising the steps of forcing molding material in a moldable condition between complementary molding surfaces at least one of which is continuously moving relative to the other, continuous sliding sealing of the molding material around a series of discrete products to be molded by the complementary molding surfaces, and establishing, through the aforementioned continuous sliding sealing of the molding material, a molding material chamber with continuous predetermined molding material pressure, temperature and confinement around the series of discrete molded products during the molding operation.

5. The method as defined in claim 4 including providing complementary cylindrical molding surfaces at least one of which is continuously moving relative to the other, and circumferentially continuous sliding sealing of the molding material in the molding material chamber around the series of discrete products to be molded by the complementary cylindrical molding surfaces.

6. The method as defined in claim 4 including maintaining the continuous sliding sealing of the molding material around the discrete products to be molded with a sliding sealing surface that is the same as one of the complementary molding surfaces.

7. The method as defined in claim 4 including forming a connected series of discrete molded products by the complementary molding surfaces.

8. The method as defined in claim 4 including the step of at least partially curing the discrete molded products by changing the temperature of the discrete molded products in the molding material chamber prior to removal from the complementary molding surfaces.

9. The method as defined in claim 4 wherein the molding material is introduced in a molten moldable condition between the complementary molding surfaces, and the step of at least partially curing by changing the temperature of the discrete molded products in the molding material chamber prior to removal from the complementary molding surfaces includes chilling.

10. A continuous molding method comprising the steps of providing complementary molding elements capable of forming discrete molded products at least one of which is continuously moving relative to the other, forcing molding material in a moldable condition between the complementary molding elements, and continuous sliding sealing of the molding material in a molding material chamber around each of the discrete products to be molded by the complementary molding elements.

* * * * *